(No Model.)

E. WAITE.
FELT BOOT OR SHOE.

No. 279,055. Patented June 5, 1883.

Witnesses.
Robert Wallace,
Matthew Clark.

Inventor
Enoch Waite
by Wm. A. Macleod
atty

UNITED STATES PATENT OFFICE.

ENOCH WAITE, OF FRANKLIN, MASSACHUSETTS.

FELT BOOT OR SHOE.

SPECIFICATION forming part of Letters Patent No. 279,055, dated June 5, 1883.

Application filed March 24, 1883. (No model.)

*To all whom it may concern:*

Be it known that I, ENOCH WAITE, of Franklin, county of Norfolk, State of Massachusetts, have invented a new and useful Improvement in Felt Boots or Shoes, of which the following, taken in connection with the drawings accompanying and forming a part hereof, is a full, clear, concise, and exact description.

Figure 1:
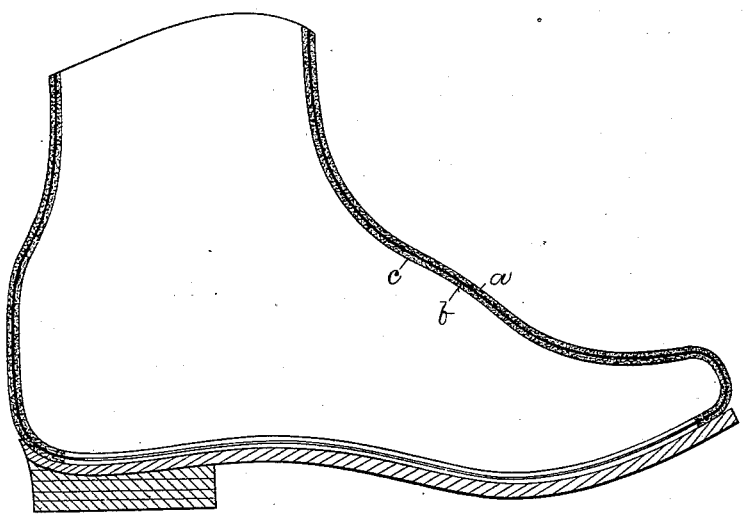
Figure 2:

In the drawings, Figure 1 is a vertical section of a shoe, showing my improvement. Fig. 2 is a section showing the material of an upper having two layers of rubber or cement.

The method of constructing my improved felt boot or shoe is not essential to my present invention.

The essential feature in my invention is the employment of layers of rubber or cement and of felt in the construction of the parts of the upper of a boot or shoe. The material may be prepared in the flat state by coating a flat piece of felt with a sheet or layer of rubber or cement in a semi-plastic state, and then placing upon the rubber or cement another layer of felt and pressing the whole together. The combined piece is then applied to the last or form, and the boot or shoe made in the ordinary manner. If a boot or shoe made in this way be viewed in section, as at Fig. 1, the upper will show at $a$ the outer layer of felt, at $b$ the layer of rubber or cement in the middle, and at $c$ the inner felt layer.

Fig. 2 shows another form of the upper material, having all the qualities of that shown in Fig. 1, and increased by the addition of another layer of rubber or cement, $d$, and another layer of felt, $e$. This might be still further increased by successive additions of the material, if desired.

I am aware that overshoes made of rubber and woven fabric and having uppers composed of several pieces have been constructed with a thin sheet of rubber re-enforcing the upper at certain points. Such shoes are shown in Letters Patent No. 59,419, dated November 6, 1866, granted to J. Letson, and No. 87,137, dated February 23, 1869, granted to A. O. Bourn, and I expressly disclaim all that is therein shown or described.

What I claim is—

A boot or shoe having the entire upper made of a single piece of material, consisting of alternate layers of felt and rubber united throughout their contact-surfaces, substantially as described.

E. WAITE.

Witnesses:
WM. A. MACLEOD,
ROBERT WALLACE.